Jan. 13, 1970    TOSHIO NAGARA ET AL    3,489,448

METHOD OF MAKING ALUMINUM HEAT EXCHANGERS

Filed Nov. 22, 1967

INVENTORS
Toshio Nagara
Nagami Oshita
Toshio Iwatsuki

BY Cushman, Darby & Cushman
ATTORNEYS

United States Patent Office 3,489,448
Patented Jan. 13, 1970

3,489,448
METHOD OF MAKING ALUMINUM HEAT EXCHANGERS
Toshio Nagara, Kariya-shi, Masami Oshita, Anjo-shi, and Toshio Iwatsuki, Aichi-ken, Japan, assignors to Nippon Denso Company Limited, Kariya-shi, Japan, a corporation of Japan
Filed Nov. 22, 1967, Ser. No. 685,137
Claims priority, application Japan, Aug. 17, 1967, 42/53,040
Int. Cl. B23p 15/26
U.S. Cl. 29—157.3     1 Claim

ABSTRACT OF THE DISCLOSURE

An aluminum heat exchanger comprising an aluminum tube or tubes for circulating a cooling medium therethrough and aluminum cooling fins arranged alternatively in juxtaposed relation to form the principal body of said heat exchanger, aluminum end plates arranged at the opposite ends of said principal body to clamp said principal body therebetween and a plurality of aluminum clamping rods connecting said end plates with each other at both sides thereof to integrate said end plates with said principal body; said tube or tubes, fins, end plates and clamping rods being brazed together at their joints by furnace brazing or dip brazing.

BACKGROUND OF THE INVENTION

Field of the invention

The present invention relates to an aluminum heat exchanger particularly adapted for use as a radiator for automobiles, or a condenser or an evaporator or air conditioner designed for use in automobiles.

Description of the prior art

Conventional aluminum heat exchangers of the type described have been produced by assembling an aluminum tube or tubes, aluminum cooling fins and aluminum end plates into a suitable shape, securely holding the component parts of the assembly in their positions by means of a jig made of a heat-resistant anti-oxidation alloy such as Inconel, stainless steel and brazing said component parts with each other at their joint by furnace brazing or dip brazing, so as to obtain fast bonding between said component parts. However, the conventional heat exchangers produced in the manner described above have the serious drawback that they are deformed by the stress produced due to the difference in coefficient of thermal expansion between the material of which the jig is made and the material of which the heat exchanger is made. In addition, the conventional heat exchangers have the drawback that they are expensive, because although the jig is made of a heat-resistant anti-oxidation material as described, it is subjected to heavy corrosion due to oxidation by the brazing flux attached thereto during the brazing operation, so that a single jig is only capable of repeated use for the production of 20 to 30 heat exchangers at most even when it is cleaned every time after its use, and accordingly the cost of jig per product is rendered high.

SUMMARY OF THE INVENTION

It is the object of the present invention to provide an aluminum heat exchanger which obviates the drawbacks of the conventional heat exchanger set forth above and which accordingly can be produced in a simple manner at a low cost and is entirely free from deformation. Namely, according to the present invention, there is provided an aluminum heat exchanger which comprises an aluminum tube or tubes, aluminum cooling fins and aluminum end plates, assembled integrally in juxtaposed relation to form the body of the heat exchanger and a plurality of aluminum clamping rods securely connecting said end plates with each other at both sides thereof; said tube or tubes, cooling fins, end plates and clamping rods being brazed together at their joints by furnace brazing or dip brazing. All of the parts of the heat exchanger, i.e. the tubes, fins, plates and rods, are made of a common material, in this case aluminum, so that no difference of thermal expansion will be experienced when the parts are subjected to high temperatures during assembly.

BRIEF DESCRIPTION OF THE DRAWINGS

The other objects, features and advantages of the present invention will become apparent from the following detailed description with reference to the accompany drawings, in which.

DESCRIPTION OF THE PREFERRED EMBODIMENTS

Figure 1:
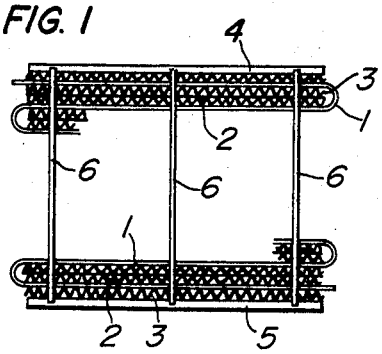
FIG. 1 is a front elevation of an embodiment of the heat exchanger according to the present invention.
Figure 2:
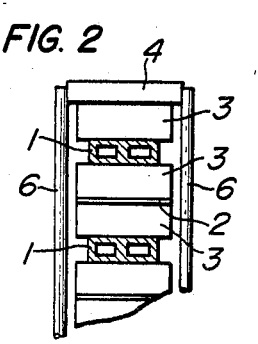
FIG. 2 is a fragmentary side view, in enlargement, of the heat exchanger shown in FIG. 1.

According to the first embodiment of the present invention shown in FIGS. 1 and 2, which is adapted for use as a condenser or an evaporator of an automobile air conditioner, a flat fin 2 and corrugated cooling fins 3 are interposed between adjacent sections of a tube 1, running zigzag, in the manner shown to form a juxtaposed structure which constitutes the principal body of the heat exchanger. End plates 4 and 5 are arranged at the opposite ends of the juxtaposed structure. These end plates are pressed towards each other temporarily by the counteracting forces exerted thereon by a clamping device, so as to securely hold said component parts in positions. In this state, the end plates 4 and 5 are connected with each other by a plurality of aluminum clamping rods 6 (three of these are used in the embodiment shown) at both sides thereof, thereby to integrate said end plates with the principal body of the heat exchanger. Thereafter, the clamping device is removed. In this case, it should be noted that the thickness and cross sectional shape of the end plates 4 and 5, and the diameter of the aluminum clamping rods, must be suitably selected before-hand because the end plates, upon removing the clamping device, are subjected to the recovering force of the corrugated cooling fins due to their elasticity. The component parts of the heat exchanger assembly in the manner described are then brazed together at their joints in their respective positions by furnace brazing or dip brazing. In this case, since the component parts composing the principal body of the heat exchanger are securely clamped together by the aluminum clamping rods, 6, arranged on both sides thereof and having the same coefficient of thermal expansion as those of the respective component parts, the principal body of the heat exchanger is not subjected to a stress at all.

Figure 3:
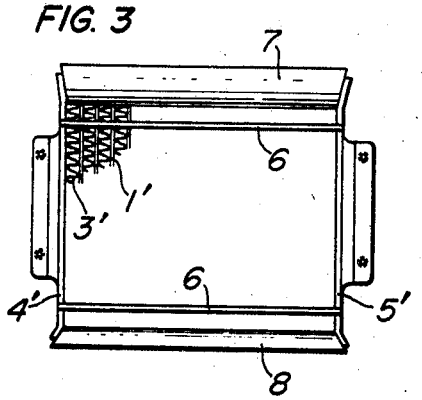
FIG. 3 is a front elevation of another embodiment of the heat exchanger of this invention.
Figure 4:
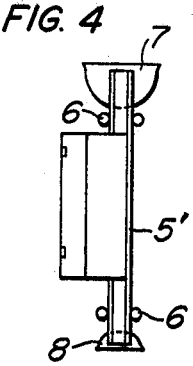
FIG. 4 is a side view of the heat exchanger shown in FIG. 3.

FIGS. 3 and 4 show another embodiment of this invention, which is adapted for use as a radiator for automobiles. In this embodiment, a plurality of tubes 1' are arranged in juxtaposed relation, with a corrugated cooling fins 3' interposed therebetween, and the opposite ends of the respective tubes 1' are secured to headers 7 and 8 respectively, to form a juxtaposed structure which constitutes the principal body of the heat exchanger. These end plates 4' and 5' are pressed towards each other temporarily by the counteracting forces exerted thereon by a clamping device and, in this state, the end plates 4' and 5' are connected with each other by aluminum clamping rods 6 at both sides thereof to integrate said end plates with the juxtaposed structure. After removing the clamping device, the joints between the respective component parts of the heat exchanger assembly are brazed by furnace brazing or dip brazing. In this case, the principal body of the heat exchanger is subjected to no stress, alike in the previous embodiment.

As described hereinabove, since, according to the present invention, the aluminum tube or tubes, aluminum cooling fins and aluminum end plates, composing the principal body of the heat exchanger, are arranged in juxtaposed relation and clamped together by the aluminum clamping rods connecting said end plates at both sides thereof, so as to form an integral heat exchanger assembly made of a common material, and thereafter all of said component parts are brazed together at their joints by furnace brazing or dip brazing, stress is not produced in the heat exchanger assembly during the brazing operation, as is produced in the case of conventional ones due to the difference in coefficient of thermal expansion between the heat exchanger and the jig used. Further, since the heat exchanger of this invention does not call for the use of a jig for the production thereof, the laborious operation of cleaning the jig can be eliminated, which has been necessitated by the conventional heat exchangers after production operation, and accordingly the production efficiency can be enhanced. Still further, the heat exchanger of this invention can be provided at lower cost than those produced by the use of a jig which is costly and the repeated use of which is subjected to a limitation, because the aluminium clamping rods are much cheaper than such jig.

We claim:
1. A method of manufacturing a heat exchanger comprising at least on aluminum tube and aluminum cooling fins arranged alternately in juxtaposed relation for forming a core of said heat exchanger, said method comprising the steps of arranging aluminum end plates at opposite ends of said core along the opposite outer layers of said juxtaposed fins and tubes, applying a plurality of aluminum rods extending between said opposing ends of said core in a manner connecting said end plates, said rods being adapted to cause said end plates to maintain a clamping force on said core when connected to said end plates, and brazing said aluminum tube or tubes and cooling fins by heating said heat exchanger as a whole in a heating means, whereby said rods are caused to act as structural members of said heat exchanger and as a clamping jig for the assembly of said heat exchanger.

References Cited

UNITED STATES PATENTS

| | | | |
|---|---|---|---|
| 1,959,464 | 5/1934 | Dryden | 165—152 X |
| 2,778,606 | 1/1957 | Lloyd et al. | 165—153 X |
| 2,838,830 | 6/1958 | Huggins | 165—152 X |
| 3,246,691 | 4/1966 | LaPorte et al. | 165—151 |
| 1,840,724 | 1/1932 | Koehring | 29—493 X |

ROBERT A. O'LEARY, Primary Examiner

A. W. DAVIS, Assistant Examiner

U.S. Cl. X.R.

29—471.1, 493; 113—118; 165—152, 153